United States Patent Office 3,019,243
Patented Jan. 30, 1962

3,019,243
11β - HYDROXY-5β-PREGNANE-3,20-DIONE BISOXIMES AND THE 11α-LOWER-ALKYL DERIVATIVES THEREOF
Gunther S. Fonken, Charleston, Mich., assignor to The Upjohn Company, Kalamazoo, Mich., a corporation of Delaware
No Drawing. Filed July 14, 1961, Ser. No. 124,022
3 Claims. (Cl. 260—397.5)

This invention relates to novel 11β-hydroxy-5β-pregnane-3,20-dione bisoxime and 11α-methyl-11β-hydroxy-5β-pregnane-3,20-dione bisoxime.

The novel compounds and the process of the present invention are illustratively represented by the following formulae:

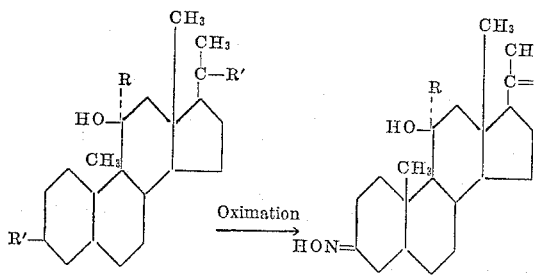

wherein R is hydrogen or methyl and R' is carbonyl oxygen (=O) or a cyclic ketal radical of the formula

wherein R" is an alkylene radical containing not more than 8 carbon atoms, and the attaching oxygen to carbon bonds are separated by a chain of at least 2 and not more than 3 carbon atoms, e.g., ethylene, 2-propylene, 1,3-propylene, 2,2-dimethyltrimethylene, 1,2-butylene, 1,3-butylene, 2,3-butylene, 2,4-amylene, 4-methyl-1,2-amylene, 6-methyl-1,3-hexylene, 1,2-heptylene, 3,4-heptylene, 1,3-octylene, etc.

The compounds of the present invention, i.e., 11β-hydroxy-5β-pregnane - 3,20 - dione bisoxime and 11α-methyl-11β-hydroxy-5β-pregnane-3,20-dione bisoxime, are central nervous system depressants useful as tranquilizers, muscle relaxants, and sedatives in the treatment of hypertension, nervous disorders and related illnesses in both humans and valuable domestic animals. These compounds exist in both solvated and unsolvated forms. They can be used in both hydrated (solvated) and anhydrous (unsolvated) forms.

This invention is a continuation-in-part of application S.N. 23,360, filed April 20, 1960.

The bisoxime compounds of the present invention have the advantage over the corresponding 3,20-diketo compounds in that they possess greatly increased central nervous system depressant activity. The comparative motor activity induced by these compounds in mice was determined using the technique of Dews (Dews, P. B. "The Measurement of the Influence of Drugs on Voluntary Activity in Mice." Brit. J. Pharmacol. 8, 46, 1953). Thirty minutes after oral administration of the compound to 6 male mice per dose, individual mice were put in an actophotometer and motor activity for a 5 minute period was determined by using the number of brakes in the light beams as the criterion. The action of the compounds are cited in the table below for several absorption times and are expressed as the percent change in motor activity over the untreated controls. (Plus values are indicative of stimulation.)

| Absorption Time (minutes) | 30 | | 60 | | 120 | |
|---|---|---|---|---|---|---|
| Oral Dose (mg./kg.) | 400 | 200 | 400 | 200 | 400 | 200 |
| 11α- methyl-11β- hydroxy -5β- pregnane-3,20-dione | +46 | +10 | +6 | −20 | +34 | −8 |
| 11α - methyl - 11β- hydroxy - 5β - pregnane-3,20-dione bisoxime | −68 | −43 | −87 | −51 | −71 | −40 |

The toxicities of both of the compounds tested for motor activity are of the same low order, demonstrating LD$_{50}$s greater than 1000 mg./kg. when administered intraperitoneally to mice.

The compounds of the present invention can be prepared and administered to mammals, birds, humans and animals in a wide variety of oral and parenteral dosage forms, singly, or in admixture with other coacting compounds. They can be associated with a carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs.

The 3,20-dione bisoxime compounds of the present invention are prepared from their corresponding 3,20-diketo or 3,20-bis(alkylene ketal) compounds by oximation, e.g., by reaction with a hydroxylamine mineral acid salt.

Starting materials for the process of the present invention are the known 11β-hydroxy-5β-pregnane-3,20-dione, 11α - methyl-11β-hydroxy-5β-pregnane-3,20-dione, other 11α-lower-alkyl-11β-hydroxy-5β-pregnane - 3,20 - diones, 11β-hydroxy - 5β - pregnane-3,20-dione-3,20-bis(alkylene ketal), 11α-methyl-11β-hydroxy-5β-pregnane-3,20-dione-3,20-bis(alkylene ketal) and other 11α-lower-alkyl-11β-hydroxy-5β - pregnane - 3,20 - dione - 3,20 - bis(alkylene ketals).

The process of the present invention comprises treating 11β-hydroxy-5β-pregnane-3,20-dione or 11α-alkyl-11β-hydroxy-5β-pregnane-3,20-dione with a hydroxylamine mineral acid salt, such as hydroxylamine hydrochloride or hydroxylamine sulfate, in a suitable solvent, such as, an alkanol, a tertiary amine, for example, pyridine, collidine, N,N-dimethylaniline and the like, or preferably an alkanol in the presence of a basic reagent such as a tertiary amine to give the corresponding 11β-hydroxy-5β-pregnane-3,20-dione bisoxime or 11α-alkyl-11β-hydroxy-5β-pregnane - 3,20 - dione bisoxime. This process can be referred to broadly as oximation. An excess of hydroxylamine, usually from two to six molar equivalents is preferably employed. The preferred hydroxylamine mineral acid salt is hydroxylamine hydrochloride and the preferred basic reagent is pyridine.

Alternatively, the oximation can be carried out using the 3,20-bis(alkylene ketals) instead of the 3,20-diketo compounds. Thus, the 11β-hydroxy-5β-pregnane-3,20-dione bisoxime or 11α-alkyl-11β-hydroxy-5β-pregnane-3,20-dione bisoxime of the present invention can be prepared from the corresponding 3,20-bis(alkylene ketals) by treating an 11β-hydroxy-5β-pregnane-3,20-dione-bis-(alkylene ketal) or 11α-alkyl-11β-hydroxy-5β-pregnene-3,20-dione-3,20-bis(alkylene ketal) with hydroxylamine, preferably in a suitable solvent such as analkanol or amine, or with a hydroxylamine mineral acid salt, such as hydroxylamine hydrochloride or hydroxylamine sulfate in solution in an amine such as pyridine or morpholine, wherein the amine serves as a base, or in alcohol or other suitable organic solvent in the presence of an amine such as pyridine, collidine, and the like, or in the presence of an alkali metal base such as sodium acetate, potassium hydroxide, potassium carbonate, and the like.

The oximation reaction is preferably carried out at 20 to 120° C., and conveniently at the reflux temperature of the reaction mixture. Under these conditions the reaction time is usually from 15 minutes to 8 hours. Both higher and lower temperatures and shorter and longer reaction times are operative, the lower temperature usually requiring a correspondingly longer reaction time.

The 11β-hydroxy-5β-pregnane-3,20-dione bisoxime or 11α-alkyl-11β-hydroxy-5β-pregnane-3,20-dione bisoxime, thus produced, can be isolated from the reaction mixture by conventional methods, for example, by pouring the reaction mixture into water and separating the resultant precipitate by filtration. Additional purification of the product can be accomplished by conventional methods, for example, by recrystallization from a suitable solvent or mixture of solvents, such as, methanol, dilute methanol, ethanol, ether, methylene chloride, methylene chloride-Skellysolve B hexanes, and the like.

PREPARATION 1

(a) 11α - methyl-11β-hydroxy-5β-pregnane - 3,20 - dione 3,20-bis(ethylene ketal)

(b) 11α-methyl-11β-hydroxy-5β-pregnane - 3,20 - dione

A solution of 12.7 g. of 5β-pregnane-3,11,20-trione-3,20-bis(ethylene ketal), prepared by the method of Oliveto et al. (J. Amer. Chem. Soc. 75, 485 [1953]), in 150 ml. of benzene (dried over calcium hydride) was diluted with 150 ml. of anhydrous ether and treated with 100 ml. of ethereal 0.67 M methyllithium. The mixture was allowed to stand for about 40 hours at room temperature and then cautiously treated with water to destroy the excess methyllithium. The organic phase was washed several times with water, filtered through anhydrous sodium sulfate and evaporated to dryness to give 11α-methyl-11β-hydroxy-5β-pregnane-3,20-dione, 3,20-bis(ethylene ketal) (a) a white foam. The foam (a) was dissolved in 200 ml. of hot methanol and 10 ml. of 3 N sulfuric acid added. After a period of about 20 hours at room temperature the slow addition of 190 ml. of water was begun, at which time crystallization of the product occurred. The slurry was then cooled to about minus 18° C. for about 15 hours, filtered, the filter cake washed repeatedly with water, and dried in vacuo at 60° C. The yield of crude product was 9.46 g. and had a melting point of 135 to 155° C. Recrystallization from a small amount of acetone and a large volume of Skellysolve B (hexanes) gave 6.75 g. (65% of theoretical) of 11α-methyl-11β-hydroxy-5β-pregnane - 3,20 - dione (b) with a melting point of 162 to 165° C. Repeated crystallization from a mixture of acetone-Skellysolve B (hexanes) yielded a product with a melting point of 171 to 175° C. and rotation [α]$_D$ of plus 106° (acetone).

Analysis.—Calcd. for $C_{22}H_{34}O_3$: C, 76.26; H, 9.89. Found: C, 76.58; H, 9.98.

EXAMPLE 1

11β-hydroxy-5β-pregnane-3,20-dione bisoxime 5 ml. of pyridine and 1.25 g. of hydroxylamine hydrochloride were added to 2.5 g. of 11β-hydroxy-5β-pregnane-3,20-dione (Oliveto et al., J. Amer. Chem. Soc. 75, 486 [1953]) in 25 ml. of ethanol. The solution was warmed on a steam bath for a period of about 2 hours, followed by dilution with approximately two volumes of water. Most of the alcohol was removed under reduced pressure and the product allowed to solidify overnight at room temperature. The solid was filtered, washed thoroughly with water and dried. Recrystallization from acetone yielded 1.1 g. of colorless, double-melting prisms with melting points of 135 to 150° C. and 239 to 244° C. An analytical sample of 11β-hydroxy-5β-pregnane-3,20-dione bisoxime prepared by recrystallization from acetone had a melting point of 238.5 to 242° C. (decomposition). The infrared absorption spectrum of the compound showed maxima at 3450, 3240, 3110 (shoulder), 1705 (acetone solvate), 1232, 1675, 1650, 973, 955, 943 and 900 (cm.$^{-1}$).

Analysis.—Calcd. for $C_{21}H_{34}O_3N_2$: C, 69.58; H, 9.45; N, 7.73. Found: C, 69.52; H, 9.68; N, 7.60.

EXAMPLE 2

11β-hydroxy-5β-pregnane-3,20-dione bisoxime

A stoichiometric equivalent amount of 11β-hydroxy-5β-pregnane-3,20-dione-3,20-bis(ethylene ketal) (Oliveto et al., J. Amer. Chem. Soc. 75, 486 [1953]) is substituted for 11β-hydroxy-5β-pregnane-3,20-dione in the procedure of Example 1, to obtain 11β-hydroxy-5β-pregnane-3,20-dione bisoxime.

Following the procedure of Example 2, but substituting for the starting 11β-hydroxy-5β-pregnane-3,20-dione-3,20-bis(ethylene ketal) other 3,20-bis(alkylene ketals) of 11β-hydroxy-5β-pregnane-3,20-dione, is productive of 11β-hydroxy-5β-pregnane-3,20-dione bisoxime.

EXAMPLE 3

11α-methyl-11β-hydroxy-5β-pregnane-3,20-dione bisoxime

A mixture of 5 g. of 11α-methyl-11β-hydroxy-5β-pregnane-3,20-dione [Preparation 1(b)] and 5 g. of hydroxylamine hydrochloride in 50 ml. of dry pyridine was heated on a steam bath for about 1.5 hours and allowed to stand at room temperature for about 48 hours. The reaction mixture was poured into a liter of water and the resulting mixture filtered. The collected solids were washed twice with water and dried at about 75° C. under reduced pressure. This residue contained the crude product which was crystallized from methylene chloride-Skellysolve B to give 3.98 g. of 11α-methyl-11β-hydroxy-5β-pregnane-3,20-dione bisoxime, having a melting point of 193 to 212° C. A sample of the product was recrystallized once from methylene chloride for analysis and had a melting point of 206 to 212° C. (with decomposition). The infrared spectrum of this material is consistent with the methylene chloride solvate of the expected compound.

Analysis—Calcd. for $C_{22}H_{36}O_3N_2 \cdot \frac{1}{2}CH_2Cl_2$: C, 64.24; H, 9.35; N, 6.66; Cl, 8.44. Found: C, 64.34; H, 9.02; N, 6.67; Cl, 7.5.

This product on simple heating to the temperature of its melting point is converted to the corresponding essentially unsolvated compound.

Following the procedure of Example 3 but substituting for the starting 11α-methyl-11β-hydroxy-5β-pregnane-3,20-dione other 11α-lower-alkyl-11β-hydroxy - 5β - pregnane-3,20-diones, is productive of the corresponding 11α-lower-alkyl-11β-hydroxy - 5β - pregnane - 3,20 - dione bisoximes.

EXAMPLE 4

11α-methyl-11β-hydroxy-5β-pregnane-3,20-dione bisoxime 775 g. of 11α-methyl-11β-hydroxy-5β-pregnane-3,20-dione dissolved in 15.1 liters of ethyl alcohol was heated with stirring to a temperature of about 70° C. A mixture of 378 g. of hydroxylamine hydrochloride and 422 g. of anhydrous sodium acetate dissolved in 2020 ml. of water was added to the steroidal solution while it was still at about 70° C. The resulting reaction mixture was heated to reflux and the refluxing maintained for a period of about 30 minutes. The hot reaction mixture was poured into 16.5 gallons of ice and water with active stirring which was continued for a period of about 1 hour. The solids that precipitated were filtered and the filter cake obtained was washed by resuspension in 3.5 gallons of water. The solid material recovered, 11α-methyl-11β-hydroxy-5β-pregnane-3,20-dione bisoxime, was dried to constant weight at about 75° C. in a vacuum oven. Its rotation [α]$_D$ was plus 88° in pyridine. Moisture determination by the Karl Fischer method showed 0.80% water.

*Analysis.*—Calcd. for $C_{22}H_{36}O_3N_2 \cdot 0.25H_2O$: C, 70.25; H, 9.66; N, 7.46. Found: C, 69.81; H, 9.46. N, 7.42.

This product on simple heating to the temperature of its melting point is converted to the corresponding essentially anhydrous compound.

EXAMPLE 5

*11α-methyl-11β-hydroxy-5β-pregnane-3,20-dione bisoxime*

A stoichiometric equivalent amount of 11α-methyl-11β-hydroxy-5β-pregnane-3,20-dione-3,20-bis(ethylene ketal), obtained as in Preparation 1(a), is substituted for 11α-methyl-11β-hydroxy-5β-pregnane-3,20-dione in the procedure of Example 3, to obtain 11α-methyl-11β-hydroxy-5β-pregnane-3,20-dione bisoxime.

Following the procedure of Example 4, but substituting for the starting 11α-methyl-11β-hydroxy-5β-pregnane-3,20-dione-3,20-bis(ethylene ketal) other 3,20-bis(alkylene ketals) of 11α-methyl-11β-hydroxy-5β-pregnane-3,20-dione, is productive of 11α-methyl-11β-hydroxy-5β-pregnane-3,20-dione bisoxime.

Following the procedure of Example 4, but substituting for the starting 11α-methyl-11β-hydroxy-5β-pregnane-3,20-dione-3,20-bis(alkylene ketal) other 11α-lower-alkyl-11β-hydroxy-5β-pregnane-3,20-dione-3,20-bis(alkylene ketals), is productive of the corresponding 11α-lower-alkyl-11β-hydroxy-5β-pregnane-3,20-dione bisoxime.

I claim:

1. 11β-hydroxy-5β-pregnane-3,20-dione bisoximes of the formula:

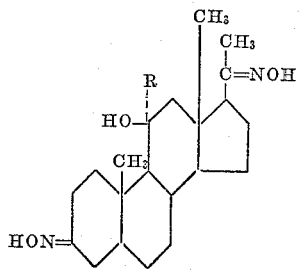

wherein R is selected from the group consisting of hydrogen and methyl.

2. 11β-hydroxy-5β-pregnane-3,20-dione bisoxime.

3. 11α-methyl-11β-hydroxy-5β-pregnane-3,20-dione bisoxime.

No references cited.